INVENTOR
RALPH W. TURNER
BY
David W. Tilbott
ATTORNEY

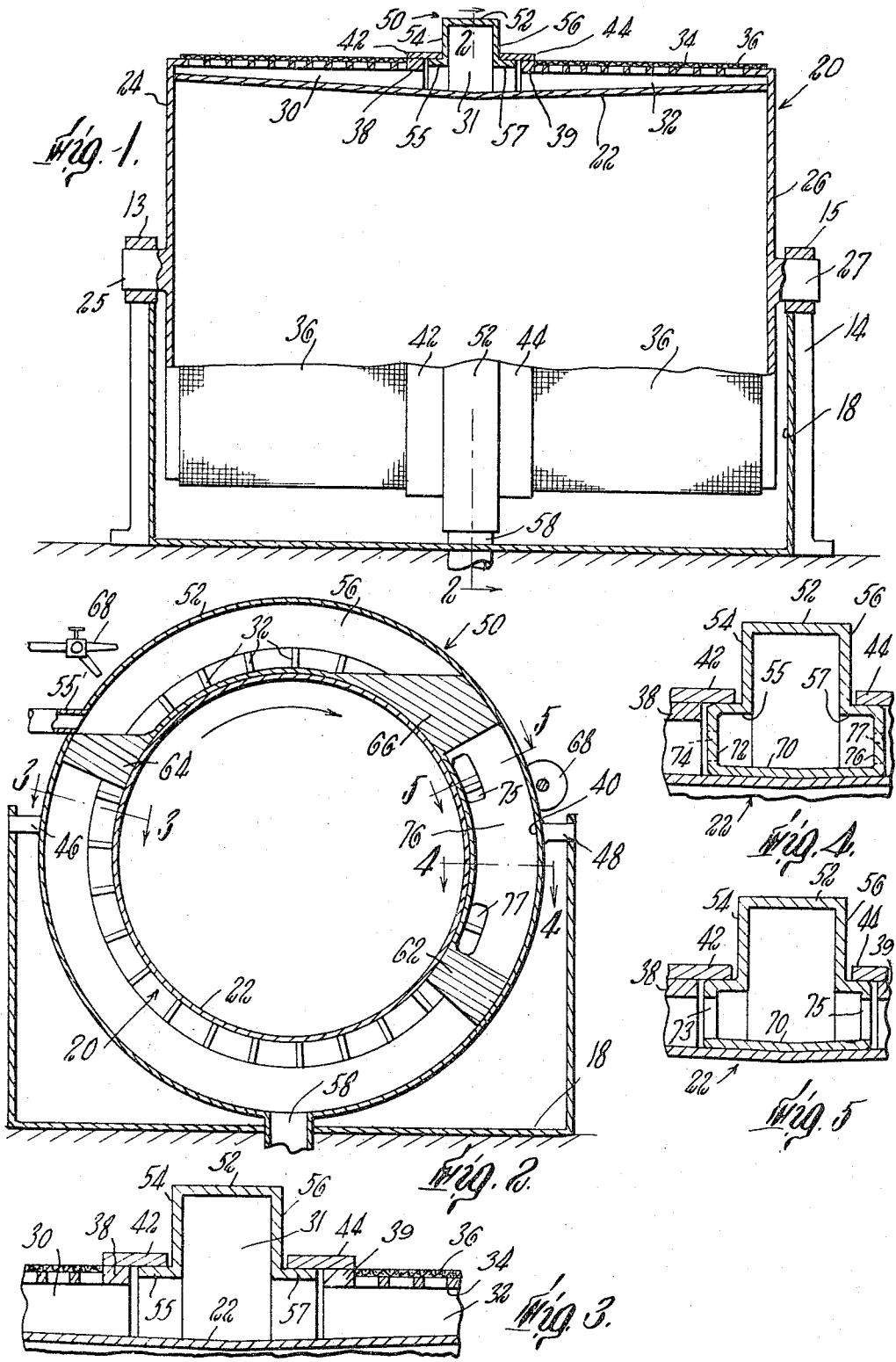

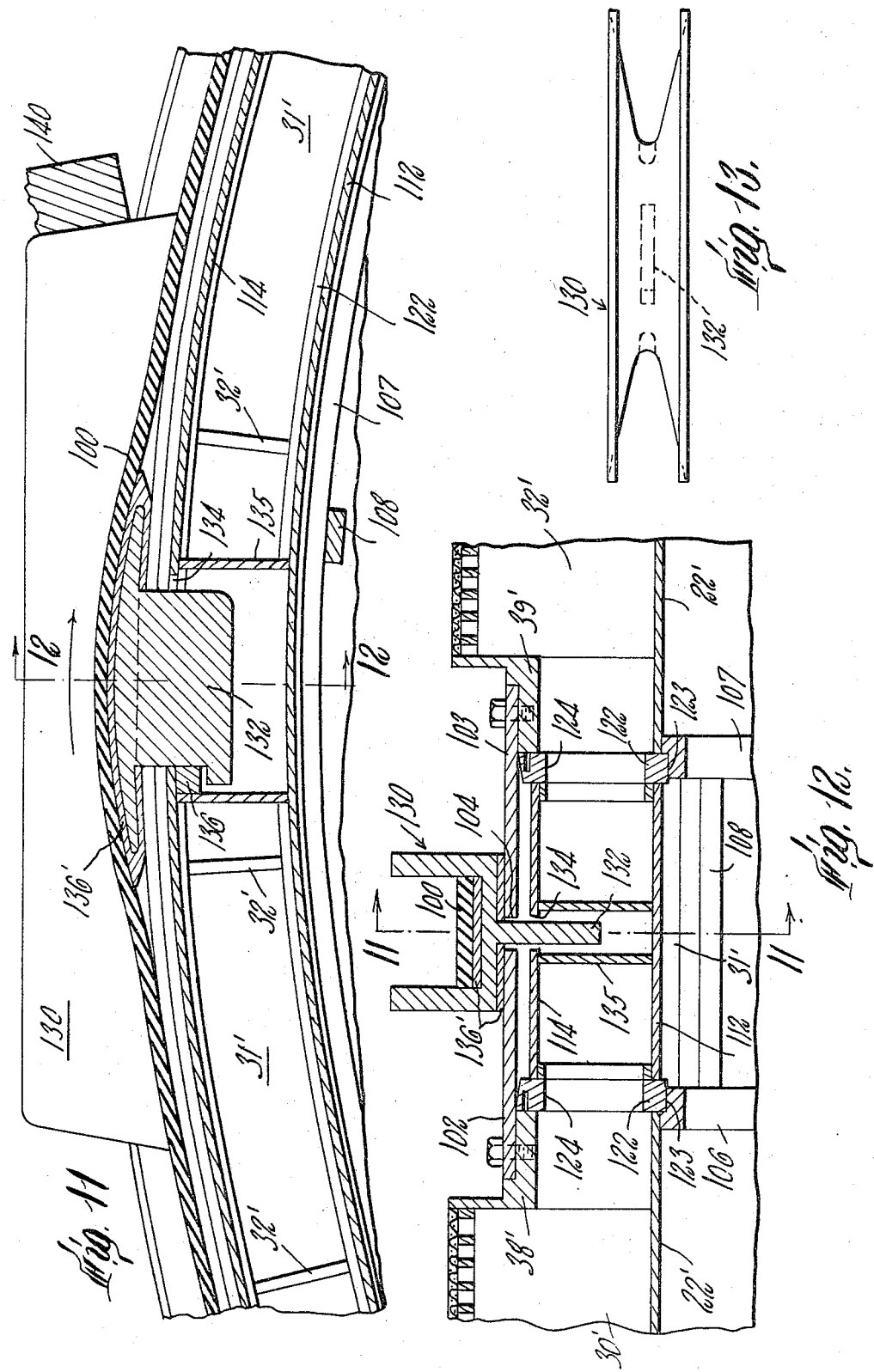

June 27, 1967 R. W. TURNER, JR 3,327,863
CENTER VALVE FILTER
Filed Sept. 27, 1966 6 Sheets-Sheet 6
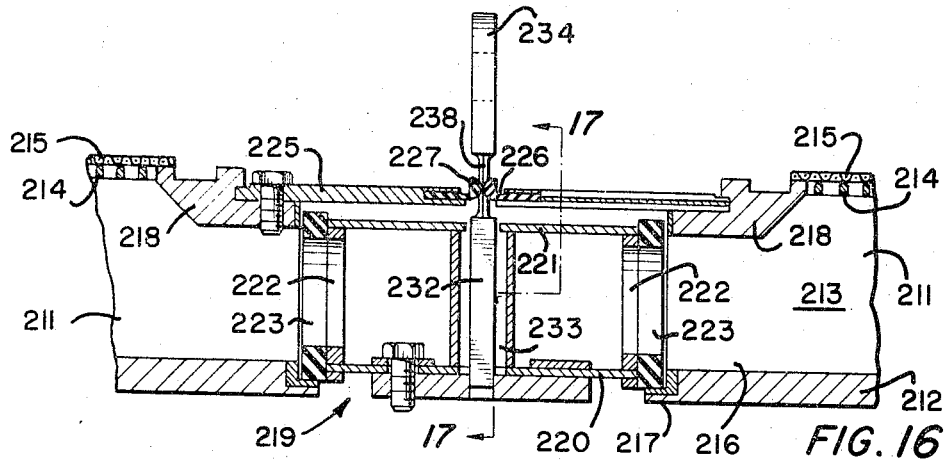
FIG. 16
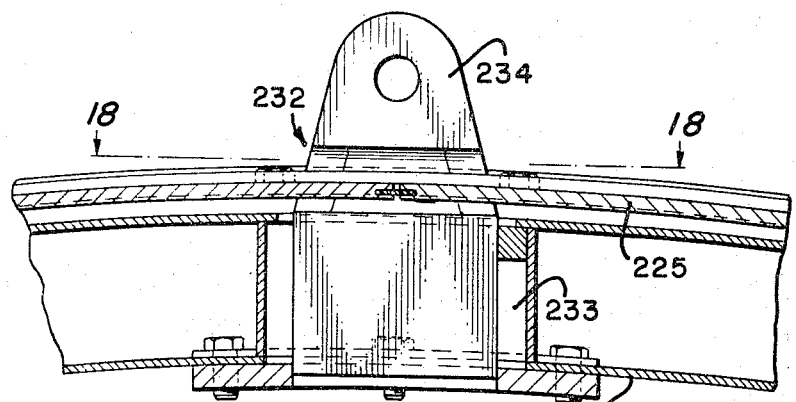
FIG. 18                    FIG. 17
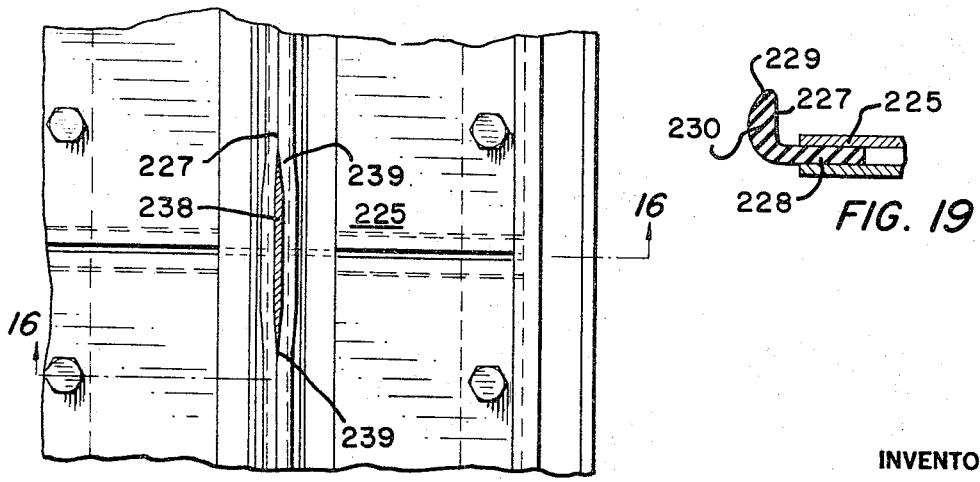
FIG. 19
INVENTOR
RALPH W. TURNER
BY David W. Tilbott
ATTORNEY

United States Patent Office 3,327,863
Patented June 27, 1967

3,327,863
CENTER VALVE FILTER
Ralph W. Turner, Jr., Nashua, N.H., assignor to Improved Machinery Inc., Nashua, N.H., a corporation of Delaware
Filed Sept. 27, 1966, Ser. No. 598,536
31 Claims. (Cl. 210—392)

This invention relates to rotary drum filters and more particularly to vacuum filters having a novel externally-held center valve structure. It is a continuation-in-part of my co-pending applications Ser. No. 561,294, filed June 28, 1966, and Ser. No. 533,090, filed Mar. 9, 1966, now abandoned.

The conventional rotary drum vacuum filter or "screen," such as is commonly used in the separation of wood pulp from its filtrate, is of generally cylindrical shape of dimensions up to about 20' long and 14' in diameter. Its outer surface is conventionally provided with a series of axially extending filtrate compartments, such filtrate compartments being conventionally connected either centrally or at their ends, through suitable manifolds, to a port valve at one end of the drum so that the drum is operated as it revolves to apply sub-atmospheric pressure to the filtrate compartments as desired and to remove liquid filtrate therefrom.

There are present a number of serious problems with such filters both of a mechanical and of a hydraulic nature, which problems become more serious as the size of the drum and its speed of rotation is increased in the interests of higher production.

A major mechanical problem arises by reason of the application of a sub-atmospheric pressure through the port valve at one end of the filter, causing high thrust forces which must be overcome, while still maintaining suitably small clearances to minimize loss of sub-atmospheric pressure, conventionally referred to as "vacuum." The practical problem of maintaining the necessary close tolerances throughout the length of a 20' drum precludes the use of a force balanced structure having valve ports at opposite ends of the drum, while internally mounted central port valves such as shown in Patent No. 2,263,852 have proved to be unduly complicated and expensive to manufacture. The constructional problems inherent in internally mounted center valves are apparent from a study of said patent. In the first place, the internal valve, although just inside the drum surface, has its support in a remote position at one end of the drum, so that extremely long and hence unduly flexible structure must be utilized, including structure having a length of essentially half the axial length of the drum plus further structure nearly equal to the radius of the drum mounted on the end of the axial structure. The total distance of the valve from its support hence may be of the order of 10-20 feet. This makes it most difficult efficiently to maintain the required vacuum seals between the stationary valve and the rotating drum element, and in fact necessitates increased maintenance as compared to conventional end port valve filters. Furthermore, the position of the valve and its seals enclosed within the surrounding drum structure makes maintenance of the valve and seal impossible without entering the drum itself, which obviously requires substantial disassembly of the filter accompanied by the necessity of taking it out of operation. This latter necessity is a particularly serious defect since standby equipment is almost never available for interim use. As a result, filters of the type shown in said patent have not been widely accepted in the industry.

A major hydraulic problem of all drum filters, including those of said patent, arises by reason of the necessity of permitting air to replace the filtrate contained in the axially extended filtrate compartments, so that the remote ends of the filtrate compartments are in effect vented to permit the filtrate freely to flow therefrom. Since this cannot occur except by air flow through the accretion itself in conventional filters, such filtrate replacement cannot occur for a substantial time after emergence. This is a serious defect in either end or center internal port valve filters, because of the inability in all of such filters for providing air for venting directly at the upper edge of the open end of a filtrate compartment. Rather, air for venting must in such filters, flow through the column of inwardly flowing filtrate in the direction opposite to the filtrate flow in order to vent the filtrate compartments, much as air bubbles into an inverted narrow mouth bottle of liquid. At best, ineffective venting occurs under such conditions so that a substantial quantity of filtrate remains in the compartment and may eventually re-enter the filter cake during the discharge portion of the filtering cycle.

It is a major object of the present invention to provide a novel drum filter free from the above mentioned problems and capable of operating in a highly efficient manner.

It is a particular feature of the novel drum filter of the invention that it is of simple mechanical construction, while being balanced as to forces produced by sub-atmospheric pressures utilized therein.

It is another feature of the invention that its filtrate compartments are vented in a novel manner directly from a valve structure located directly at the end of the filtrate compartment, providing greatly improved efficiency of filtrate removal over heretofore known rotary drum filters.

It is still another feature of the invention that by reason of its structural arrangement the filtrate can flow from a filtrate compartment directly into the valve structure located immediately adjacent the end thereof, providing still further improved filtering efficiency.

It is still another feature of the invention that novel drum sealing means are provided for controlling the application of atmospheric and sub-atmospheric pressures thereto for accretion of a filter cake, possibly washing it, and discharging it from the filter.

These and other objects and features of the invention are accomplished in a novel manner by providing, in a drum filter having a filter cycle including an arcuate portion wherein sub-atmospheric pressure is applied thereto for filter cake accretion and an arcuate portion wherein said sub-atmospheric pressure is cut off for filter cake removal, a novel externally held, stationary, balanced center valve structure for control of the application of said sub-atmospheric pressure, removal of filtrate from the filtrate compartments, and for the cutting off of said sub-atmospheric pressure by the application of atmospheric or super-atmospheric pressure for removal of the filter cake from the drum.

More specifically, the rotary drum filter of the invention has a rotatably mounted cylindrical drum with a pair of axially spaced series of axially aligned filtrate compartments about the periphery of said drum throughout the circumference thereof. Each of the axially spaced series of compartments has a closed end adjacent the remote ends of said drum and an open end generally centrally of said drum, so as to provide a peripheral band of said open ends forming filtrate outlets extending entirely around the drum.

According to the invention, a stationary externally held valve element is mounted in fixed position, as on the filter frame, and is held against rotation solely externally of the rotating drum, the valve element being positioned at the open ends of the band of filtrate compartments and extending at least partly around the periphery of said drum for rotation of said drum relatively thereto. The valve element need only extend around the drum for a portion of its periphery, within which it is desired to control the sub-atmospheric pressure as required by the filter cycle, and, for example, separate valve element portions may be utilized for discharge of the filter cake from the drum, application of sub-atmospheric pressure to the filtrate compartments, separation of washing filtrate supplied by suitable showers, and the like. Preferably, for sealing the drum as is required by reason of the external support of the valve element, a novel sealing band which rotates with the rotating drum is utilized. Suitable discharge means, preferably fixed, is provided for discharging the filtrate which flows from the filtrate compartments, as well as to supply a connection to a suitable source of sub-atmospheric pressure, such as a conventional vacuum pump or barometric filter leg.

Another preferred means for sealing or closing the annular slot in the drum is with a pair of inwardly extending and abutting resilient lips attached to the opposite sides of the slot and anchoring the valve by a thin blade extending between the resilient lips. The blade is shaped to cooperate with the resilient lips to open the lips as the drum rotates past the blade while maintaining a substantially tight seal between the lips and blade.

For the purpose of more fully explaining further objects and features of the invention, reference is now made to the following detailed description of preferred embodiments thereof, together with the accompanying drawings, wherein:

FIG. 1 is a side cross-section of a rotary drum filter according to the invention;

FIG. 2 is an end cross-section of the drum filter of FIG. 1 taken on the line 2—2 thereof;

FIGS. 3–5 are enlarged cross-section details of portions of the drum filter of FIG. 1;

FIG. 11 is an enlarged partial end cross-section detail taken on the line 10—10 of FIG. 9;

FIG. 12 is a partial cross-section detail taken on the line 12—12 of FIG. 11; and FIG. 13 is a detail plan view of an element of the drum filter of FIGS. 9–12;

FIG. 16 is an enlarged section taken on line 16—16 of FIG. 15, line 16—16 also being shown in FIG. 18;

FIG. 17 is a section taken on line 17—17 of FIG. 16;

FIG. 18 is a section taken on line 18—18 of FIG. 17; and

FIG. 19 is an enlarged fragment of FIG. 16 illustrating a drum sealing lip.

Figure 6:
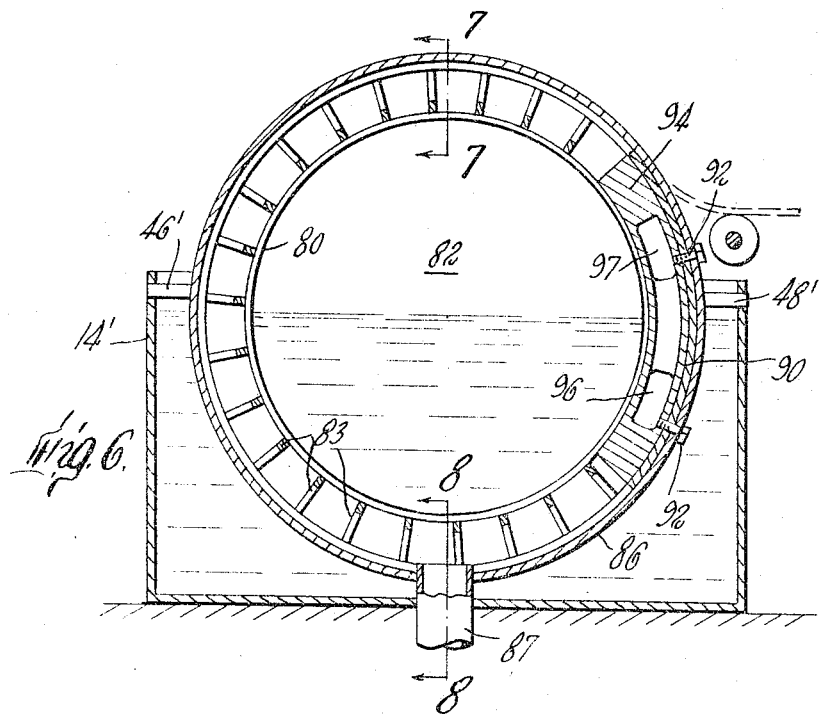
FIG. 6 is an end cross-section of a modification of the drum filter of FIGS. 1–5.

Referring to FIGS. 1–5 of the drawings, the rotary drum filter therein shown includes an enclosed cylindrical drum, generally designated 20, as a movable filter support, said drum being rotatably mounted in a frame 14 incorporating a tank 18 containing a slurry in which the drum 12 is partially submerged. The drum itself includes a generally cylindrical portion 22 supported between end plates 24, 26, providing a fully enclosed drum construction. The end plates are provided with trunnions 25, 27 carried in suitable bearings 13, 15 in frame 14.

On the outer surface of cylindrical drum portion 22 are provided two axially spaced series of filtrate compartments, such filtrate compartments being formed between adjacent pairs of a plurality of axially and radially extending imperforate ribs 30, 32 covered with a filter medium. The filter medium, as is conventional, may include winding wire 34 covered by a suitable screen 36. Drum end disks 24, 26 provide closed remote outer ends for the filtrate compartments, the inner ends of said compartments being open at the center in a band of filtrate outlets extending around the drum by reason of the axial spacing of the inner ends of the opposed series of ribs 30, 32 generally centrally of drum 12 to form a channel 31 therebetween. Imperforate rings 38, 39 are provided overlying ribs 30, 32, respectively, at the inner open ends of the filtrate compartments, said rings being axially spaced from one another at either side of channel 31. The ribs 30, 32 together with drum portion 22 and the overlying filter medium thus provide a plurality of axially extending filtrate compartments throughout the circumference of the drum, on each side of the generally central circumferential channel 31. Preferably, the drum surface 22 is sloped radially inwardly from end disks 24, 26 toward channel 31 to aid in filtrate drainage.

According to the present invention, drum 20 is provided with novel stationary externally-held valve means positioned generally centrally of the drum for cooperation with the band of inner open ends of each of the two series of filtrate compartments. Such valve means at least partially surrounds the drum and is held against rotation solely externally of said drum, as on frame 14.

More specifically as to the details of the externally-held central valve element of the invention, as shown in FIGS. 1–5, it consists of a generally rectangular cross-section annular housing extending around the drum, such housing having an outer peripheral wall 52, radially extending side walls 54, 56 having outwardly axially extending flanges 55, 57 respectively. Flanges 55, 57 cooperate with rings 38, 39 to provide outer sealing surfaces about which are trained deckle straps 42, 44, respectively, to seal the stationary valve housing to the rotating drum to prevent air and liquid leakage. Mounting lugs 46, 48 are provided on housing wall 52 for mounting said housing on frame 14 to hold it stationary against rotation, although it may be made adjustable throughout several degrees of arcuate movement, if desired, in order that the timing of the filter cycle may be varied. A filtrate outlet pipe 58 is provided in the bottom of said housing wall 52, which pipe may be connected to the usual vacuum pump or barometric leg for providing a sub-atmospheric pressure within the housing and for removing filtrate therefrom.

As best shown in FIG. 2, the filter cake accretion portion of the filter cycle extends throughout an arc from a closed end wall 62, at which point the sub-atmospheric pressure is to be applied to the filtrate compartments (generally at the four o'clock position for clockwise rotation as shown in FIG. 2) to the point at which a filtrate compartment emerges from the level of the slurry in tank 18, after which point, drying of the filter cake begins, with the filtrate flow from the open ends of the filtrate compartments beginning to diminish. The washing portion of the filter cycle, if one be utilized, extends from a closed end wall 64 to a succeeding closed end wall 66, an outlet pipe 55' being provided above end wall 64, for receiving wash water filtrate from showers 68. Beyond end wall 66, it is desired to cut off the sub-atmospheric pressure for filter cake discharge, followed by submergence of the filtrate compartments which takes place in the filter cycle portion between end walls 66 and 62. Throughout the arc defined between end walls 62 and 66 (in a clockwise direction as shown in FIG. 2) the housing communicates with the filtrate compartment open ends so that it is in effect positioned in channel 31 between said open ends partly surrounding the drum for about 270 degrees so that the drum rotates within the valve element.

With such arrangement, and with a source of sub-atmospheric pressure connected to housing outlet pipe 58, filtrate will flow through the filter medium to accrete a filter cake from the time a filtrate compartment passes into submergence and beyond end wall 62 (at the four o'clock position in FIG. 2), until the filtrate compartment emerges from the slurry in the tank. Thereafter, it will continue to drain, and to move drying air through the filter cake until it moves beyond end wall 64. The filtrate which passes out of the filtrate compartments will flow downwardly through channel 31 and within the housing 50 to its outlet pipe 58. In the wash sector between end wall 64 and end wall 66, washing shower water is applied to the filter cake by showers 68 and, after passing through the filter cake, filter media and filtrate compartments, is removed through pipe 55′, to which is also connected a suitable source of sub-atmospheric pressure to dry the filter cake until it passes beyond the end wall 66.

In the 90 degree sector between end wall 66 and end wall 62, the sub-atmospheric pressure must be relieved for discharge of the filter cake over discharge roll 68, thereafter, it is advantageous to close off the channels as quickly as possible to prevent filtrate flow therefrom into the valve and so prevent the desired air flow therealong from the lower ports which allow displaced air to escape from the channels during their initial submergence, so that gravity accretion can occur before vacuum is applied. As shown in FIGS. 4 and 5, this may best be accomplished by utilizing a bottom enclosure for the housing, including a bottom wall 70 as the bottom wall of the portion of the valve element extending for said arc, together with cooperating side walls 72, 76. Said side walls are provided with upper ports 73, 75 and lower ports 74, 77, said lower ports being located below the level of slurry in the vat so that air displaced from the filtrate compartments upon submergence will flow from ports 74, 77, through ports 73, 75 into the filtrate channels and thus to the atmosphere. End walls 62, 64 and 66 are of a width greater than the width of a filtrate compartment to prevent direct air flow thereacross, such being particularly important between the 90 degree discharge segment and the remainder of the valve element. It will be understood that the wash segment may be omitted, if desired, by omitting end wall 64 and pipe 55′, so that sub-atmospheric pressure is applied to such segment by pipe 58, any filtrate therefrom flowing into pipe 58 along channel 31 within the housing 50.

Still further modifications of the structure of FIGS. 1–5 may be made, utilizing the novel, externally-held central valve structure of the invention, some of such modifications being shown in FIGS. 6–9.

Figure 7:
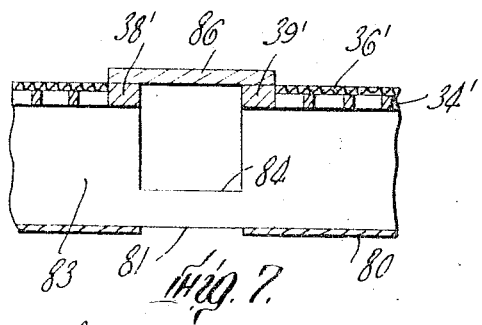
FIGS. 7 and 8 are enlarged cross-section details of portions of the drum filter of FIG. 6.
Figure 8:
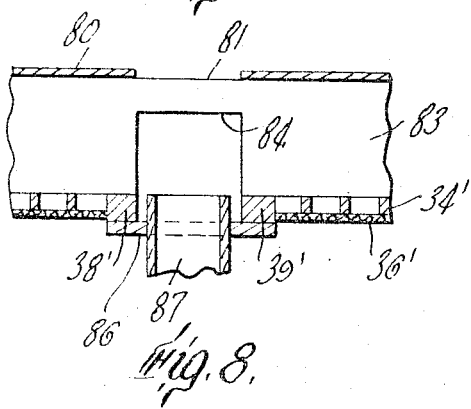

For example, in FIGS. 6–8 is shown a drum structure having an interior open to the open ends of the filtrate compartments, the drum including a cylindrical shell 80 with a central peripheral slot 81 and with a pair of imperforate end plates 82, having axially and radially extending ribs 83, extending therebetween. The ribs 83 are provided on their outer sides with generally centrally positioned rectangular notches 84 forming a channel for receiving a valve element, generally designated 90. As before, the ribs may be covered with winding wire 34′ covered by a suitable screen 36′ with imperforate rings 38′, 39′ overlying the ribs 83 at each side of the notches 84, at the inner open ends of the filtrate compartments. A deckle strap 86 is provided surrounding said drum and extending between the rings 38′, 39′, said deckle strap being mounted on frame 14′ by suitable lugs 46′, 48′ to maintain it in stationary position. Said deckle strap on its bottom is provided with a through pipe 87 for discharge of filtrate and application of sub-atmospheric pressure to the interior of the drum. With this arrangement, filtrate passes from the open ends of the filtrate channels, directly into the interior of the drum, and thence into pipe 87, the entire interior of the drum being maintained at sub-atmospheric pressure.

In the structure of FIGS. 6–8, the valve element 90 is mounted on deckle strap 86 by means of suitable fastenings 92, and includes an enclosed housing of generally rectangular cross-section with end closures 94 of suitable width. Upper and lower ports 96, 97 are provided in the side walls of said housing which ports operate as described above with reference to FIGS. 1–5. However, unlike the structure of FIGS. 1–5, the valve element of FIGS. 6–8 need surround but a limited sector of the drum within which it is desired to control the application of sub-atmospheric pressure to the filtrate channels by cutting it off therein for discharge of the filter cake and for resubmergence of a compartment.

Figure 9:
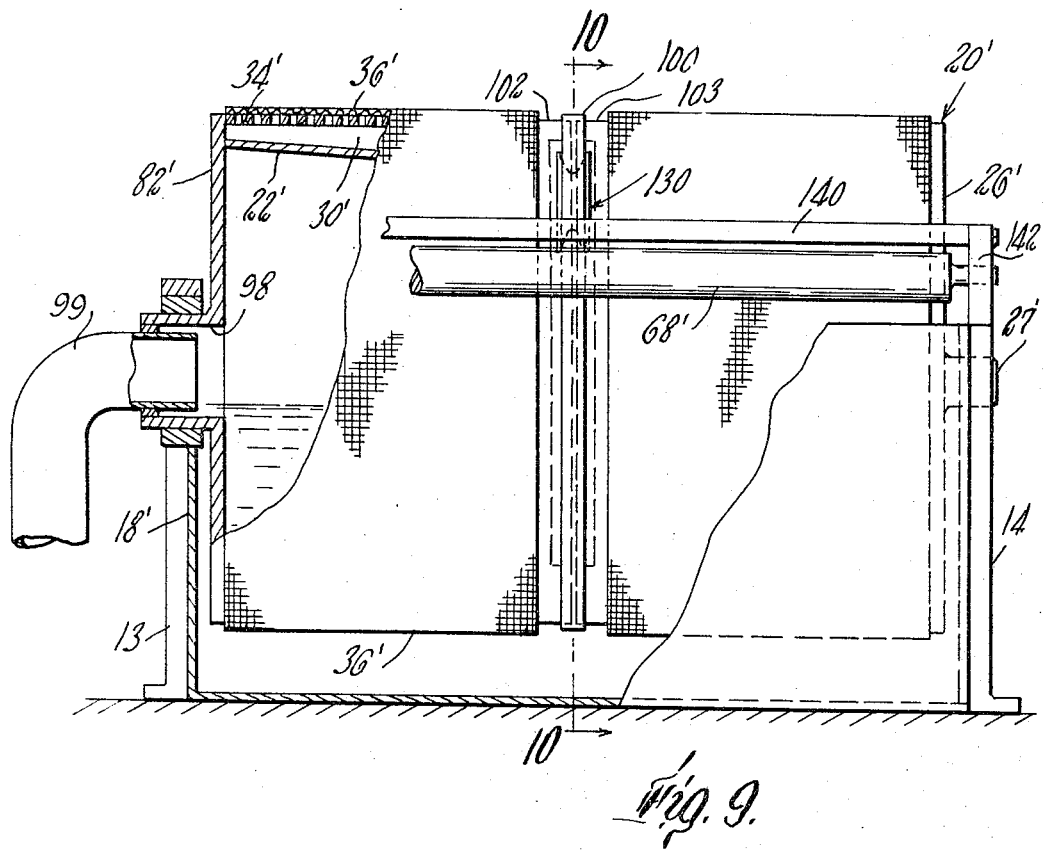
FIG. 9 is a partial side cross-section of a modification of the drum filter of FIGS. 6–8, showing the rotating sealing band of the invention.
Figure 10:
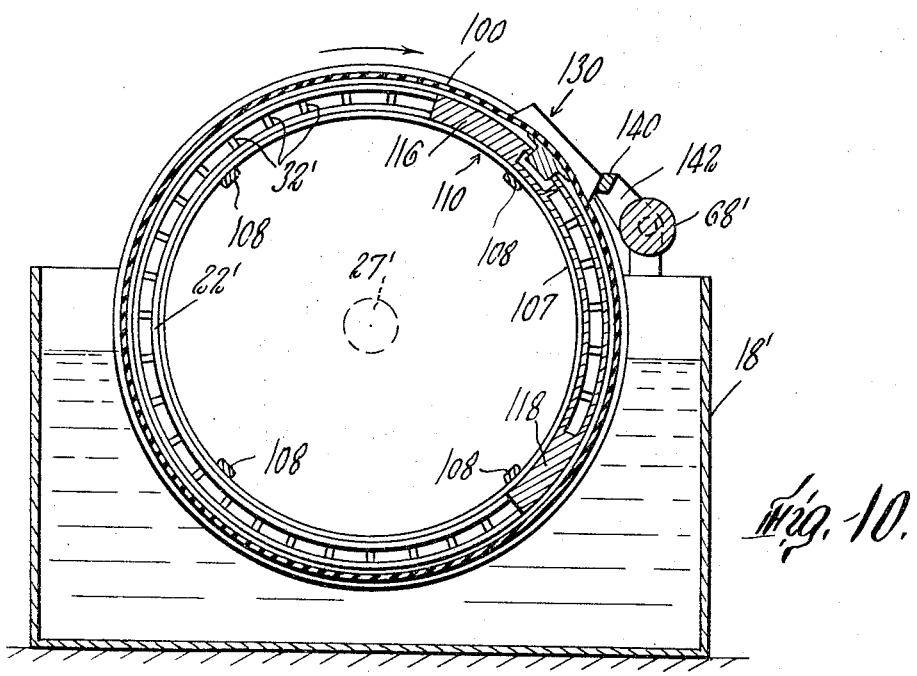
FIG. 10 is an end cross-section of the drum filter of FIG. 9, taken on the line 10—10 thereof.

FIG. 9 shows a modification of the structure of FIGS. 6–8 wherein the filtrate is collected inside the drum and is discharged through a hollow trunnion 98 in end plate 82′, a stationary pipe 99 having suitable seals being connected to said hollow trunnion and to a suitable source of vacuum, for discharge of filtrate and application of sub-atmospheric pressure to the interior of the hollow drum. In this embodiment, filtrate will of course fill said drum up to the level of said pipe 99. The structure of FIGS. 1–5 may be similarly modified for axial discharge, if desired, by providing a circumferential opening in cylindrical drum wall 22 at channel 31.

FIGS. 9–13 also show the novel means for sealing the rotating drum according to the invention, comprising a novel sealing band 100 which rotates with the rotating drum structure effectively to eliminate frictional drag as occurs with the deckle strap arrangements as above described, with their resulting power consumption. In this regard, the structure of FIGS. 9–13 differs from that of FIGS. 1–5 in important respects as to the details of the externally-held central valve element. Otherwise, it is generally similar, so that identical reference numerals with prime symbols have been applied to FIGS. 9–12 where appropriate, the elements of which reference numerals are described with reference to FIGS. 1–5.

As best shown in FIGS. 11 and 12, the open inner ends of the filtrate compartments are provided with inner end rings 38′, 39′ to which are bolted cylindrical flanges 102, 103 respectively. The flanges extend axially toward one another and provide a relatively narrow opening or slot 104 between them, which opening or slot extends peripherally around the entire drum. The inner opposing edges of drum 22′ are spaced from one another for a substantial distance and terminate in members 106, 107, which are connected by a plurality of tie bars 108, providing a channel 31′ which extends around the entire periphery of the drum between the axially spaced open ends of the filtrate compartments, with slot 104 in its outer wall, the flanges 102, 103 forming the outer surface of the drum filter on each side of slot 104. The interior of the drum 22′ is open to the filtrate channels between the ribs 30′, 32′ except as a valve element may be positioned therein. In the drum filter of FIGS. 9–13, the valve element, generally designated 110, extends for about 120 degrees throughout the discharge and submergence portions of the filter cycle from about the 2 o'clock to the 4 o'clock position (FIG. 10), and is positioned immediately within the outer surface of the drum filter radially inwardly of flanges 102, 103 at slot 104. The valve element 110 includes an inner bottom wall 112 and an outer top wall 114 coaxial with flanges 102, 103, having a slot 134 radially inwardly of slot 104 together with end walls and side walls at least at its end portions. Thus side wall 116 and side wall 118 are of sufficient angular width to prevent a filtrate channel from being connected simultaneously to the interior of the drum and to the valve element 110. Further side walls may be provided for porting as with ports 75 and 77 described with reference to FIGS. 1–5.

Valve element 110 is provided with side seal elements, including inner seal elements 122 which are received in ways 123 in members 106, 107 to support the valve element 110 in its running position against drum 22′ as well as to seal it, and outer seal elements 124 which seal against the end rings 38′, 39′ and flanges 102, 104. To prevent rotation of the valve element as the drum rotates, a shoe 130 is provided externally of the drum, said shoe having a radially inwardly extending keel 132 which extends through slot 104 in the outer drum wall and through slot 134 in the outer wall 114 of valve element 110 and contacts transverse cross member 136 of valve element 110. A wall 135 may be provided within valve element 110 about keel 132 and slot 134 for sealing. Shoe 130 is maintained in fixed position by shoe supporting and positioning bar 140 which bar extends throughout the axial length of the drum and is attached to machine frame 14 by brackets 142.

Shoe 130 is generally in the shape of a rectangular open ended, open topped trough having a streamlined bottom wall with a layer 136′ of low friction organic plastic material such as Teflon thereon, the shoe bottom wall being interposed between band 100 and the outer surface of the drum at flanges 102, 103 upon which the shoe rides. The sides of the shoe extend axially beyond the band and radially outwardly to act as band guides, with the ends of said guides at one end of the shoe resting against bar 140 to support the shoe in non-rotating position. The distance between its side walls and the shape of the bottom wall of shoe 130 is such as to receive and guide the endless sealing band 100, of resilient rubber-like material, which extends entirely around the drum at flanges 102, 103 so as to overlie and seal slot 104 throughout its entire extent, except beneath shoe 130 over which area the sealing is accomplished by the bottom of the shoe 130. Shoe 130 may be readily removed from the drum, after removing band 100, by tilting it to unhook it from beneath transverse cross member 136 and then moving it radially outwardly through slot 134.

In operation, the drum filter of FIGS. 9–13 functions as described above with reference to FIGS. 1–5 insofar as the filtering action is concerned, but differs substantially in its mechanical aspects in that sealing band 100 is carried around on the surface of flanges 102, 103 at the same speed as the surface speed of the flange surfaces so there is no relative movement therebetween. The only relative movement occurs at the flange and band contacting surfaces of shoe 130, which extend for but a short angular distance and so produce but low drag forces, particularly in view of the low friction material covering such surfaces. The reduction in drag forces over deckle strap structures, with the resulting power savings, is particularly important in large diameter filters, with which the present invention is particularly concerned.

Referring in general to the various structures as above described, it will be seen that in each structure described, the duct means, that is, pipe 58 in FIGS. 1–5, 87 in FIGS. 6–8 and 99 in FIG. 9, are provided for connection of the filtrate compartments to a source of sub-atmospheric pressure and for removal of filtrate and that the stationary wall means, that is, the housing of FIGS. 1–5 and the deckle strap 86 of FIGS. 6–9, together with cooperating end closures of a width greater than the peripheral width of a filtrate channel, are provided surrounding the drum throughout the arcuate portion of the drum wherein sub-atmospheric pressure is applied to the open ends of the filtrate compartments. Thus, in its simplest conceivable form, the stationary wall means need extend around the drum for a distance no greater than that portion wherein it is desired to apply sub-atmospheric pressure, plus suitably wide filtrate compartment end closure means, with the filter cake removal and submergence portion of the filter cycle being open to the atmosphere. For example, referring to FIG. 2, the housing 50 need only extend in a clockwise direction as shown, and include end closures 62 and 66, with the wash portion of the cycle being omitted and the discharge valve structure between end closures 66 and 62 also being omitted so that the filter cake removal proceeds by admission of atmospheric air through the filter medium in the region below the discharge roll 68.

Figure 14:
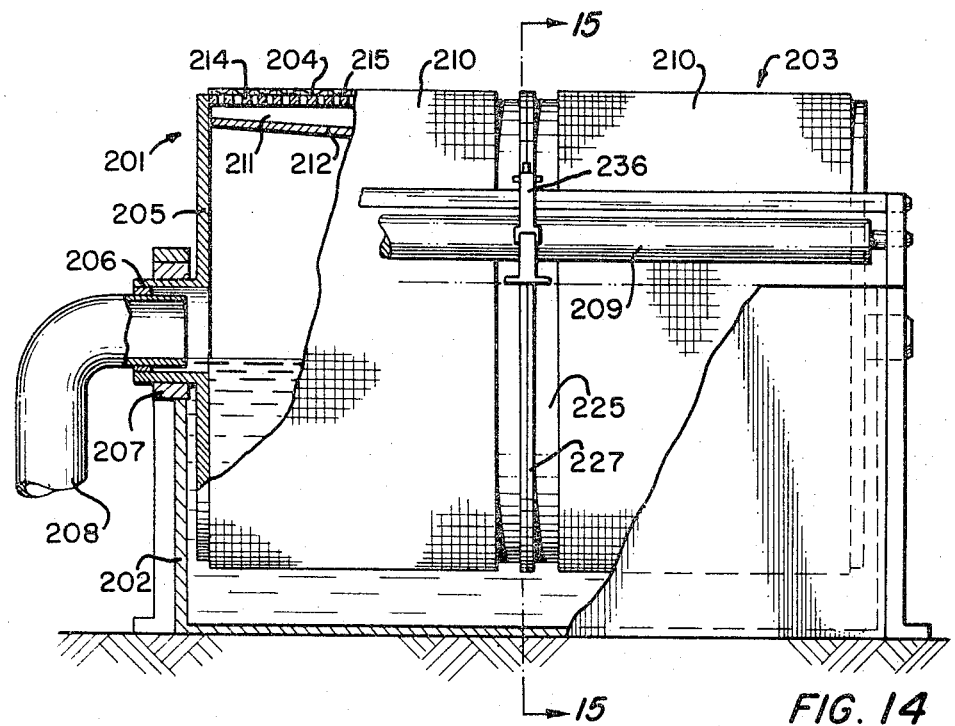
FIG. 14 is a side elevational view of a rotary drum filter embodying my invention and having portions cut away.

The drum filter 201 shown in FIG. 14 includes a tank 202 adapted to hold a liquid slurry composed in part of paper making fibers. A drum 203 is partially immersed in the slurry in the tank 202 and includes a cylindrical circumference 204 and a pair of end plates 205. Trunnions 206 are mounted on the end plates 205 for rotatably supporting the drum in bearing supports 207 located at the opposite ends of the drum 203. A vacuum pipe 208 extends through a trunnion 206 located at one end of the drum 203 with means provided between the pipe 208 and the trunnion 206 to allow the drum 203 to rotate about the pipe 208. A cake discharge roll 209 is mounted along the longitudinal side of the tank 202 for removing the fiber cake from the drum 203 in the usual manner. The drum 203 is divided midway of its length into a pair of axially aligned drum halves 210, and an internal bracing structure (not shown) rigidly interconnects together the two drum halves 210 in axially spaced relationship, providing an annular valve space between the inner ends of the two drum halves 210. Both drum halves 210 rotate as a single drum 203.

The circumference of each drum half 210 includes a series of longitudinally extending filtrate compartments 211 spaced circumferentially around the drum half 210. Each filtrate compartment 211 includes a floor 212 and a pair of circumferentially spaced sidewalls or ribs 213 extending longitudinally along the floor 212. Generally, the floor 212 of all the compartments 211 in a drum half 210 is a single annular structure. A series of support wires 214 are wound circumferentially around the top edges of the ribs 213, and a filter screen 215 is wound over the wires 214.

Each filtrate compartment 211 has an outlet 216 located at its longitudinal inner end spaced from and opposing the outlet 216 of the opposite drum half 210. The outlets 216 of both drum halves 210 drain into the annular valve space formed between the spaced opposed inner ends of the drum halves. This arrangement is shown in FIG. 16. The inner edges of the filtrate compartment floors 212 are provided with cut-away shoulders 217 for supporting an arcuately shaped valve 219 in the annular valve space between the outlets 216 of the drum halves 210. The inner end edges of the screen 215 are supported on an annular rim 218 forming the outer radial boundaries for the filtrate compartment outlets 216, as shown in FIG. 16. The valve 219 is located in the annular valve space between the filtrate compartment outlets 216 of the two drum halves 210 in a slidable and substantially sealing relationship with the compartment outlets 216, as disclosed in my copending patent application, mentioned above.

The arcuate valve 219 includes an arcuately extending bottom 220, an arcuate top 221 and longitudinally spaced sides 222. The sides 222 include ports 223 for connecting the valve 219 with the filtrate compartments 211 in the two drum halves 210.

Figure 15:
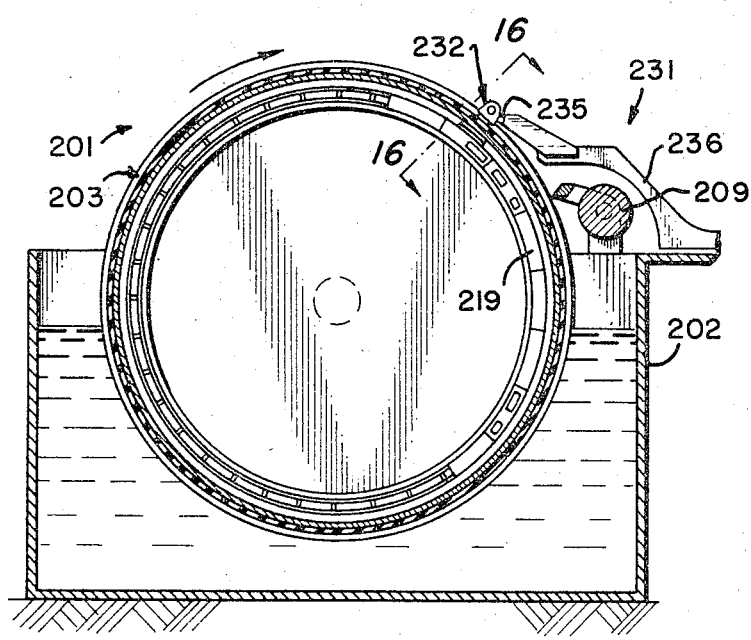
FIG. 15 is a section taken on line 15—15 of FIG. 14.

The filter drum 203 rotates in a clockwise direction, as indicated by the arrow in FIG. 15, while the valve 219 remains stationary. Soon after a portion of the drum periphery enters the slurry in the tank 202, a vacuum is applied to the filtrate compartments 211 beneath the immersed portion of the drum periphery. Thereafter a cake of fibers progressively builds up on the screen 215 until the drum periphery rises out of the slurry. After the filter cake rises from the slurry, it may be alternately dried and washed (the washing showers are not shown in the drawings). Eventually the cake reaches the valve 219 where the vacuum in the drum is sealed off from the filtrate compartments 211 to release the cake from the vacuum. Thereafter the cake is removed from the drum by the cake discharge roll 209.

Each of the axially spaced rims 218 bordering the annular valve space carries an annular rim flange 225. Both rim flanges 225 extend longitudinally toward each other and terminate to form a narrow circumferential slot 226 located over the annular valve space. The inner edges of the rim flanges 225 carry a pair of L-shaped resilient lips 227 for sealing the slot 226. The lips 227 are fastened to the edges of the rim flanges 225 by any suitable means which will form a leak proof seal between the lips 227 and flanges 225.

Each lip 227 comprises in cross section a leg 228 attached to the flange 225 and a foot 229 extending radially outward of the drum 203 substantially at right angles to the leg 228, shown in FIG. 19. The foot 229 has a rounded sole 230. In operation the two lips 227 are arranged with their rounded soles 230 in resilient abutting engagement to form a substantially tight seal over the slot 226 to prevent air from flowing through the slot 226 and reducing the vacuum in the interior of the drum. Atmospheric pressure acting on the outer surfaces of the lips 228 aids in pressing the lips 227 tightly together. This action is due to the vacuum inside of the drum. The lips 227 may be composed of a number of resilient materials, such as neoprene, polyvinyl chloride, natural rubber and Teflon.

The arcuate valve 219 is anchored against rotating with the drum 203 by an anchor means 231 which includes a blade 232. The blade 232 extends through the slot 226 between the lips 227 and is attached to the valve 219 in any suitable manner. As shown, the blade 232 is seated in a chamber 233 formed in the valve 219 with its root attached to a plate fastened to the bottom 220 of the valve 219. The chamber 233 is sealed off from the interior of the valve 219 by cooperating walls to prevent leakage from the interior of the valve 219 into the chamber 233. The outer end 234 of the blade 232 abuts an arcuate rest 235 mounted on a bracket 236 fixed on the side of the tank 202. The bracket 236 and the arcuate rest 235 lock the blade 232 against rotating the drum 203.

The portion of the blade 232 located between the lips 227 is reduced in cross section to form a thin waist portion 238, as shown in FIGS. 16 and 18. The thin waist portion 238 is formed with leading and trailing knife edges 239. As shown in FIG. 18, the thin waist portion 238 cooperates with the lips 227 to urge the lips apart as they rotate past the blade 232, while cooperating with the lips 227 to provide a tight seal therebetween. The surfaces of the thin waist portion 238 are provided with a very smooth finish to minimize any abrasion or other injury to the lips 227.

Various other modifications of the invention, utilizing the unique concept of a rotary drum vacuum filter having an externally-held stationary center valve means and with or without a rotating sealing band, all within the spirit of the invention and the scope of the appended claims, will be apparent to those skilled in the filter art.

I claim:

1. A rotary drum filter having a filter cycle including an arcuate drum portion wherein sub-atmospheric pressure is applied for filter cake accretion and an arcuate drum portion wherein said sub-atmospheric pressure is cut off for filter cake removal, said filter comprising a rotatable cylindrical drum having a plurality of axially extending filtrate compartments throughout the circumference of said drum, each said compartment having a closed end adjacent the remote ends of said drum and an open end generally centrally of said drum, providing a peripheral band of said open ends extending entirely around the drum, stationary means held against rotation solely externally of said drum, said means being positioned generally centrally of said drum at least partly surrounding said drum and cooperating with the open ends of said filtrate compartments for control of said sub-atmospheric pressure during said cycle portions.

2. A rotary drum filter having a filter cycle including an arcuate drum portion wherein sub-atmospheric pressure is applied for filter cake accretion and an arcuate drum portion wherein said sub-atmospheric pressure is cut off for filter cake removal, said filter comprising a rotatable cylindrical drum having a pair of axially spaced series of axially extending filtrate compartments arranged in the form of an annular volume adjacent the periphery of said drum throughout the circumference of said drum, each said compartment having a closed end adjacent the remote ends of said drum and an open end generally centrally of said drum, providing a peripheral band of said open ends extending entirely around the drum, and stationary means held against rotation solely externally of said drum, said means being positioned generally centrally of said drum at least partly surrounding said drum and cooperating with the open ends of said filtrate compartments for control of said sub-atmospheric pressure during said cycle portions.

3. A rotary drum filter as claimed in claim 2 further including a tank containing a slurry to be filtered and wherein said means includes an enclosed valve element having a lower port communicating with said filtrate compartments immediately following immersion thereof beneath the liquid level of said slurry, and an upper port communicating with said filtrate compartments above the level of said slurry.

4. A rotary drum filter having a filter cycle including an arcuate drum portion wherein sub-atmospheric pressure is applied for filter cake accretion and an arcuate drum portion wherein said sub-atmospheric pressure is cut off for filter cake removal, said filter comprising a rotatable cylindrical drum having a plurality of axially extending filtrate compartments throughout the circumference of said drum, each said compartment having a closed end adjacent the remote ends of said drum and an open end generally centrally of said drum, providing a peripheral band of said open ends extending entirely around the drum, duct means for connection of said filtrate compartments to a source of sub-atmospheric pressure and for removal of filtrate from said filtrate compartment, stationary wall means held against rotation solely externally of said drum, said wall means being positioned generally centrally of said drum at least surrounding said drum throughout the arcuate portion of said drum wherein sub-atmospheric pressure is applied and cooperating with the open ends of said filtrate compartments for application of said sub-atmospheric pressure during said arcuate cycle portion wherein sub-atmospheric pressure is applied by connecting said filtrate compartments to said duct means and by disconnecting said filtrate compartments from said duct means during said arcuate drum portion wherein said sub-atmospheric pressure is cut off.

5. A rotary drum filter as claimed in claim 4 wherein said duct means includes an outlet adjacent the bottom of said drum.

6. A rotary drum filter as claimed in claim 4 wherein said duct means includes an outlet along the axis of said drum.

7. A rotary drum filter having a filter cycle including an arcuate drum portion wherein sub-atmospheric pressure is applied for filter cake accretion and an arcuate drum portion wherein said sub-atmospheric pressure is cut off for filter cake removal, said filter comprising a rotatable cylindrical drum having a plurality of axially extending filtrate compartments throughout the circumference of said drum, each said compartment having a closed end adjacent the remote ends of said drum and an open end generally centrally of said drum, providing a peripheral band of said open ends extending entirely around the drum, duct means for connection of said filtrate compartments to a source of sub-atmospheric pressure and for removal of filtrate from said filtrate compartment, stationary wall means held against rotation solely externally of said drum, said wall means being positioned generally centrally of said drum at least surrounding said drum throughout the arcuate portion of said drum wherein sub-atmospheric pressure is applied and cooperating with the open ends of said filtrate compartments for application of said sub-atmospheric pressure during said arcuate cycle portion wherein sub-atmospheric pressure is applied by connecting said filtrate compartments to said duct means, said stationary wall means including filtrate compartment end closure means effective to disconnect said filtrate compartments from said duct means during said arcuate drum portion wherein said sub-atmospheric pressure is cut off.

8. A rotary drum filter as claimed in claim 7 wherein said stationary wall means defines a filter cake accretion arcuate portion and a filter cake washing arcuate portion with wall means therebetween, and further includes duct means connected to said filter cake washing arcuate portion of said stationary wall means.

9. A rotary drum filter as claimed in claim 8 wherein said stationary wall means further defines an arcuate drum portion wherein said sub-atmospheric pressure is cut off and super-atmospheric pressure applied for filter cake removal.

10. A rotary drum filter having a filter cycle including an arcuate drum portion wherein sub-atmospheric pressure is applied for filter cake accretion and an arcuate drum portion wherein said sub-atmospheric pressure is cut off for filter cake removal, said filter comprising a frame including a tank containing a slurry to be filtered, a cylindrical drum mounted for rotation on said frame and having a plurality of axially extending filtrate compartments in an annular volume adjacent the periphery of said drum throughout the circumference of said drum, with a filter medium cooperating with the outer sides of said drum accretion of a filter cake thereon, each said compartment having a closed end adjacent the remote ends of said drum and an open end generally centrally of said drum, providing a peripheral band of said open ends extending entirely around the drum, a source of sub-atmospheric pressure, duct means for connection of said filtrate compartments to a source of sub-atmospheric pressure and for removal of filtrate from said filtrate compartment, stationary wall means connected to said frame and held against rotation by said frame solely externally of said drum, said wall means being positioned generally centrally of said drum at least surrounding said drum throughout the arcuate portion of said drum wherein sub-atmospheric pressure is applied and cooperating with the open ends of said filtrate compartments for application of said sub-atmospheric pressure during said arcuate cycle portion wherein sub-atmospheric pressure is applied by connecting said filtrate compartments to said duct means, said stationary wall means including filtrate compartment end closure means of a peripheral width at least as great as the peripheral width of a filtrate compartment and effective to disconnect said filtrate compartments from said duct means during said arcuate drum portion wherein said sub-atmospheric pressure is cut off.

11. A rotary drum filter as claimed in claim 10 further including a stationary enclosed valve element mounted on said frame, said valve element having a lower port communicating with said filtrate compartments immediately following immersion thereof beneath the liquid level of said slurry, and an upper port communicating within said filtrate compartments above the level of said slurry.

12. A rotary drum filter as claimed in claim 11 wherein said stationary wall means entirely surrounds said drum.

13. A rotary drum filter having a filter cycle including an arcuate drum portion wherein sub-atmospheric pressure is applied for filter cake accretion and an arcuate drum portion wherein sub-atmospheric pressure is cut-off for filter cake removal, said filter comprising a rotatable cylindrical drum having a pair of axially spaced series of axially extending filtrate compartments arranged in the form of an annular volume adjacent the periphery of said drum throughout the circumference of said drum, each said compartment having a closed end adjacent the remote ends of said drum and an open end generally centrally of said drum with said series of open ends being axially spaced from one another providing spaced peripheral bands of said open ends with an open channel therebetween having an opening in the outer periphery of said drum extending entirely around the drum, stationary valve means positioned in said channel and held against rotation solely externally of said drum by means extending through said opening, said stationary valve means extending at least partly around the periphery of said drum for cooperation with the open ends of said filtrate compartments for control of said sub-atmospheric pressure during said cycle portions, and sealing means for said opening.

14. A rotary drum filter as claimed in claim 13, wherein said sealing means comprises an endless sealing band carried by said drum for rotation therewith.

15. A rotary drum filter as claimed in claim 14, further including external shoe means supported in fixed position on an outer surface of said drum and extending for a limited peripheral angular distance thereabout in sealing relationship to said opening, said shoe means having a stationary valve supporting portion extending through said opening with a portion of said shoe means being interposed between said band and said outer drum surface and a portion extending axially beyond said band for support of said shoe means externally of said drum.

16. A rotary drum filter having a filtrate cycle including an arcuate drum portion wherein sub-atmospheric pressure is applied for filter cake accretion and an arcuate drum portion wherein said sub-atmospheric pressure is cut off for filter cake removal, said filter comprising a rotatable cylindrical drum having a pair of axially spaced series of axially extending filtrate compartments arranged in the form of an annular volume adjacent the periphery of said drum throughout the circumference of said drum, each said compartment having a closed end adjacent the remote ends of said drum and an open end generally centrally of said drum with said series of open ends being axially spaced from one another providing spaced peripheral bands of said open ends with an open channel therebetween having an opening in the outer periphery of said drum extending entirely around the drum, and an endless sealing band carried by said drum for rotation therewith, said band extending axially across said opening throughout the entire periphery of said drum and being in sealing relationship with said opening at least throughout a major proportion of the periphery of said drum, a stationary valve means positioned in said channel and at least partly extending around the periphery of said drum where the sub-atmospheric pressure is cut off, for cooperation with the open ends of said filtrate compartments for control of said sub-atmospheric pressure during said cycle portions, shoe means supported in fixed position on an outer surface of said drum and extending for a limited peripheral angular distance thereabout in sealing relationship to said opening, said shoe means having a stationary valve supporting portion extending through said opening and a portion interposed between said band and said outer surface of said drum and shoe supporting means located externally of said drum to support said shoe means in non-rotating fixed position on said drum, said stationary valve means being held against rotation by said shoe means solely externally of said drum.

17. A rotary drum filter as claimed in claim 16 wherein said shoe means has a portion extending axially beyond said band.

18. A rotary drum filter as claimed in claim 17 wherein said shoe means has radially outwardly extending side portions providing guides for said band, the ends of said guides at one end of said shoe means being in contact with said shoe supporting means to support said shoe means against rotation.

19. A rotary drum filter having a filter cycle including an arcuate drum portion wherein sub-atmospheric pressure is applied for filter cake accretion and an arcuate drum portion wherein said sub-atmospheric pressure is cut off for filter cake removal, said filter comprising a rotatable cylindrical drum having a pair of axially spaced series of axially extending filtrate compartments arranged in the form of an annular volume adjacent the periphery of said drum throughout the circumference of said drum, each said compartment having a closed end adjacent the remote ends of said drum and an open end generally centrally of said drum with said series of open ends being axially spaced from one another providing spaced peripheral bands of said open ends with an open channel therebetween, said channel having an outer peripheral wall with a slot therein extending entirely around the drum, and an endless sealing band carried by said drum for rotation therewith, said band extending axially across said slot throughout the entire periphery of said drum and being in sealing relationship with said slot at least throughout a major proportion of the periphery of said drum, stationary valve means positioned in said channel radially inwardly of said outer peripheral wall and at least partly extending around the periphery of said drum, for cooperation with the open ends of said filtrate compartments for control of said sub-atmospheric pressure during said cycle portions, shoe means supported in fixed position on the outer surface of said outer peripheral wall and extending for a limited peripheral angular distance thereabout in sealing relationship to said slot, said shoe means having a stationary valve supporting portion extending through said opening and a portion interposed between said band and said outer peripheral wall of said drum, and shoe supporting and band guiding means located externally of said drum to support said shoe means in non-rotating fixed position on said drum and to guide said band means to maintain it in sealing relationship to said slot, said stationary valve means being held against rotation by said shoe means solely externally of said drum.

20. A rotary drum filter as claimed in claim 19 wherein said shoe means has a covering of a low friction material on its band and wall contacting surfaces.

21. A rotary drum filter having a filtrate cycle including an arcuate drum portion wherein sub-atmospheric pressure is applied for filter cake accretion and an arcuate drum portion wherein said sub-atmospheric pressure is cut off for filter cake removal, said filter comprising:
  a rotatable cylindrical drum having a pair of axially spaced series of axially extending filtrate compartments arranged in the form of an annular volume adjacent the periphery of said drum and circling said drum;
  each compartment having an open end located generally intermediate the ends of said drum with said open ends forming a series or band of filtrate outlets circling said drum;
  a pair of axially spaced circularly extending ways mounted on said drum adjacent said filtrate outlets;
  a stationary valve positioned over a portion of said filtrate outlets and at least partly extending around the periphery of said drum where the sub-atmospheric pressure is cut off for co-operation with said filtrate outlets for control of said sub-atmospheric pressure during said cycle portions;
  said valve being slidably mounted and supported on said ways to allow said drum to rotate while said valve remains stationary;
  said ways holding and preventing said valve from falling or moving radially inwardly or axially away from its proper position over the filtrate outlets; and
  means for holding said stationary valve against rotating with said drum.

22. The rotary drum filter of claim 21 wherein:
said filtrate outlets are arranged in a pair of axially spaced peripheral bands of filtrate outlets forming an open channel therebetween opening radially inwardly; and
said stationary valve is located in said channel with said ways slidably holding said valve in said channel.

23. The rotary drum filter of claim 22 wherein:
said ways are mounted adjacent the inwardly open side of said channel and project over the inner side of said stationary valve to hold said valve in said channel.

24. The rotary drum filter of claim 21 wherein:
said means for holding said valve against rotating with said drum is loosely connected to said valve providing limited movement in both the axial and radial directions between said valve and said means so that said valve is free to follow said ways and, when necessary, to move both axially and radially relative to said means.

25. A rotary drum filter comprising:
a rotary drum;
a valve located in said drum intermediate its ends adapted to remain stationary as said drum rotates;
an annular slot provided in the circumference of the drum and circling said drum intermediate its ends;
a stationary anchoring means extending through said slot and engaging said valve to lock it against rotating with said drum; and
a pair of annular resilient sealing lips attached to the opposite sides of the slot in the drum circumference and extending across said slot to seal the slot.

26. The drum filter of claim 25 wherein:
said pair of resilient lips are in resilient abutting engagement intermediate the sides of the slot.

27. The drum filter of claim 26 wherein:
the lips are rounded along their abutting edges.

28. The drum filter of claim 27 wherein:
each of the lips is L-shaped in cross section having a leg attached to a side of the slot and a foot extending radially outwardly of the slot with the sole of the foot abutting the sole of the foot on the opposite lip.

29. The drum filter of claim 26 wherein:
said anchor means extends between said pair of resilient lips with said lips abutting the opposite sides of the anchor means to seal the portion of the slot around the anchor means.

30. The drum filter of claim 29 wherein:
said anchor means includes a blade extending between the lips; and
the portion of the blade engaging the lips is relatively thin lengthwise of the drum and elongate in the circumferential direction of the drum and is shaped to cooperate with the lips to provide a high degree of sealing as the lips rotate past the blade.

31. The drum filter of claim 30 wherein:
the portion of the blade between the lips has knife edges on its leading and trailing edges to cooperate with the lips in forming a seal.

No references cited.

SAHIH N. ZAHARNA, *Primary Examiner.*